June 9, 1925.  
T. P. GARANKIN  
1,540,936  
AUTOMATIC GAS AND ELECTRIC COUPLING FOR RAILWAY CARS  
Filed March 15, 1923  3 Sheets-Sheet 1

THEODORE P. GARANKIN  
INVENTOR.

BY  
John P. Mironow  
ATTORNEYS.

June 9, 1925.
T. P. GARANKIN
1,540,936
AUTOMATIC GAS AND ELECTRIC COUPLING FOR RAILWAY CARS
Filed March 15, 1923
3 Sheets-Sheet 2
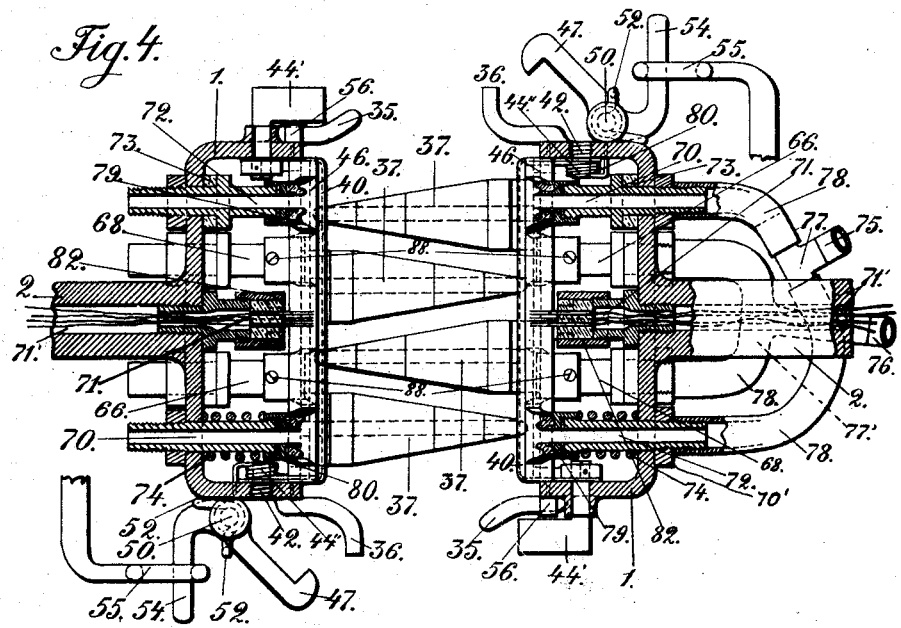
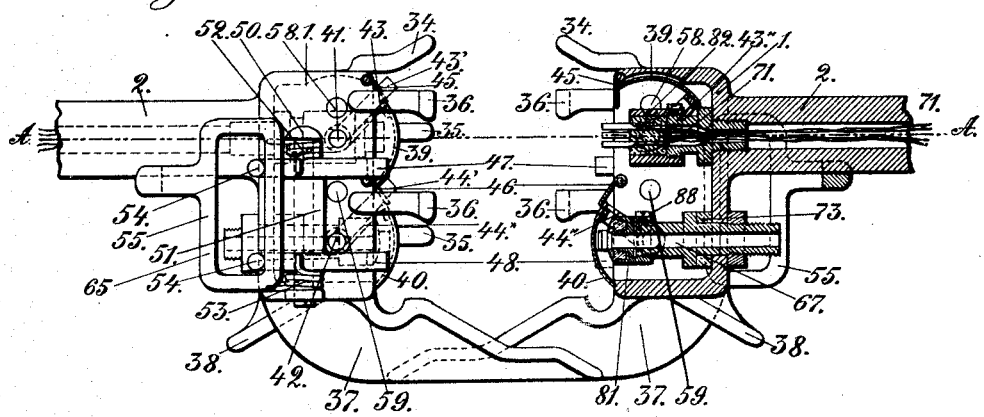
THEODORE P. GARANKIN
INVENTOR.
BY John P. Nikonow
ATTORNEY June 9, 1925.  1,540,936
T. P. GARANKIN
AUTOMATIC GAS AND ELECTRIC COUPLING FOR RAILWAY CARS
Filed March 15, 1923   3 Sheets-Sheet 3
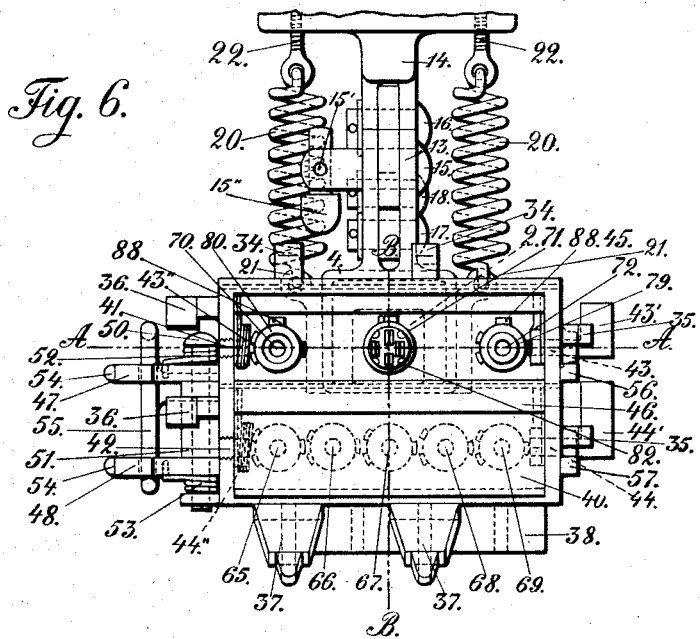
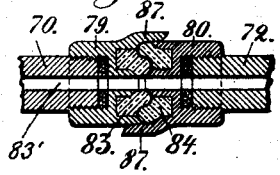 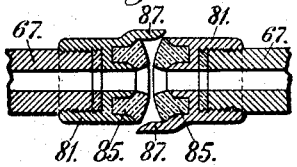 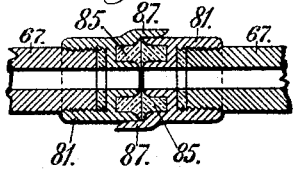
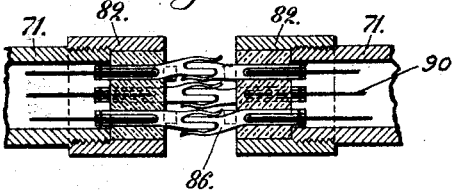
THEODORE P. GARANKIN
INVENTOR.
BY John P. Nixonov
ATTORNEYS.

Patented June 9, 1925.

1,540,936

UNITED STATES PATENT OFFICE.

THEODORE P. GARANKIN, OF NEW YORK, N. Y.

AUTOMATIC GAS AND ELECTRIC COUPLING FOR RAILWAY CARS.

Application filed March 15, 1923. Serial No. 625,421.

*To all whom it may concern:*

Be it known that I, THEODORE P. GARANKIN, citizen of Russia, and resident of New York city, in the county of New York and State of New York, have invented certain new and useful Improvements in Automatic Gas and Electric Couplings for Railway Cars, of which the following is a specification.

My invention relates to automatic gas and electric couplings for railway cars and has a particular reference to couplings adapted to be mounted in conjunction with car couplings and adapted to connect all the gas, water, steam etc. pipes and electric conductors of one car with those of the next car in a train.

The object of my invention is to provide a coupling of the character above indicated which would contain in one box all the individual couplings for all the pipes and conductors between the cars, the ends of said pipes and conductors being automatically closed when the coupling is disconnected, the operation of my coupling being entirely automatic and controlled only by the relative position of the cars. That is, my coupling becomes automatically coupled with the corresponding coupling of the next car when these cars are brought together, and becomes automatically uncoupled when the cars are moved apart.

My invention is more fully described in the accompanying specification and drawings in which—

Figure 1:
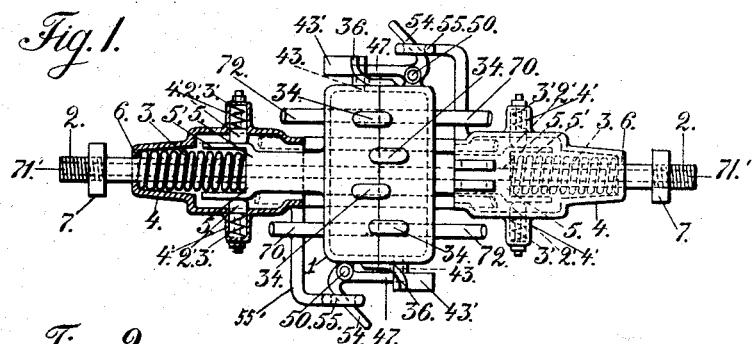
Figure 2:
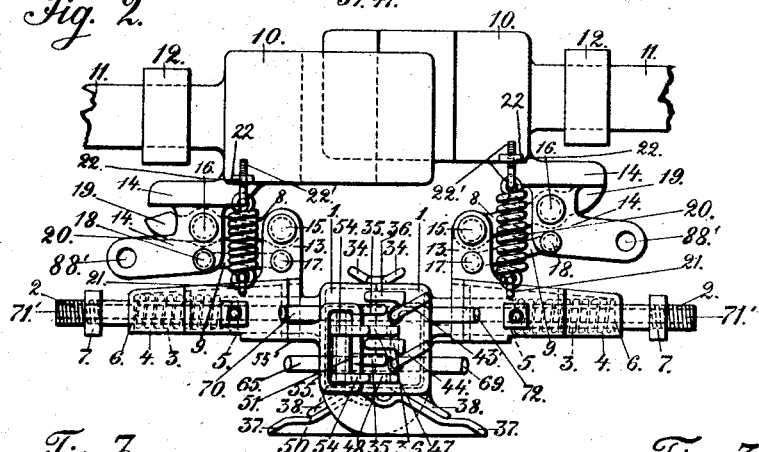
Figure 3:
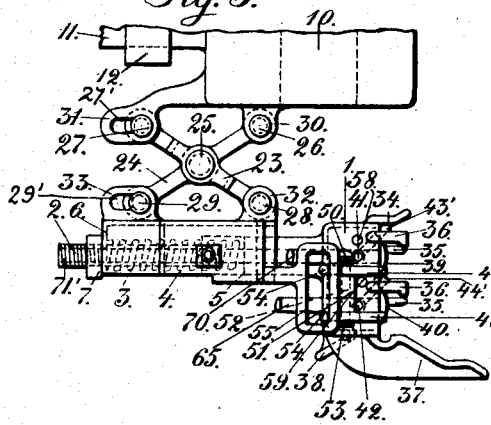
Figure 3:
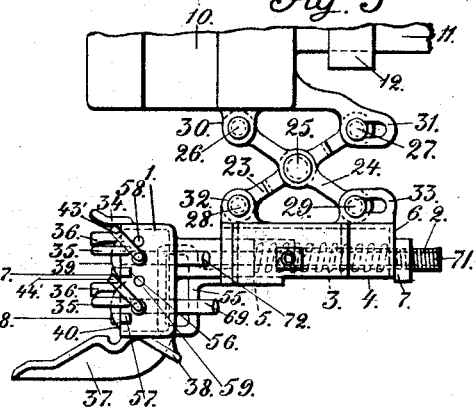

Fig. 1 is a plan view of my coupling partly in section and detached from the car, the respective halves of the coupling being shown coupled together, Fig. 2 is a side elevation of my coupling in connection with a mechanical car coupling, Fig. 3 is an elevation of one coupling half with a modified suspension means, Fig. 3' is a corresponding coupling half of the other car, these couplings being shown in a position before they come in contact to be coupled, Fig. 4 is a plan view partly in section of couplings in an uncoupled condition, Fig. 5 is a side elevation of same partly in section, Fig. 6 is an end view, Fig. 7 is a detailed view of pipe couplings in a coupled condition, Fig. 8 is a modified arrangement of pipe ends shown uncoupled, Fig. 9 is same in a coupled condition, and Fig. 10 is a detailed view of electrical connectors.

My coupling consists of a housing 1 open on a front end and provided with an extension 2 in the rear, this extension being in the form of a tubular rod with a spring 3 placed in a box or housing 4. The spring 3 rests with one end against the edge 6 of the aperture in the box 4 for the rod 2, and with the other end against an enlarged portion 5 of the extension 2. The spring 3 is partly compressed when assembled and tends to move the housing 1 away from the box until a regulating nut 7, placed on a threaded end of the rod 2, strikes the edge 6 of the housing or box 4. In this position the coupling rests until it comes in contact with a coupling of another car.

The aperture in the box 4 for the extension 5 is made sufficiently large to allow for a side movement of the housing 1 which is necessary in order to connect the couplings properly when the cars are somewhat out of alignment. Normally the housing 1 is kept in its central position by means of aligning springs 3' with bolts 2' placed in pockets 4' in the box 4 and adapted to bear against sides of the extension 5 or against special parallel lugs 5' on this extension.

The housing 1 is suspended from the car coupling 10, although it may be suspended directly from a drawbar 11. The suspension is accomplished by means of two links of equal length, 8 and 9, attached on one side to pivots or bolts 15 and 17 passing through a lug 13 on the housing 1, and pivotally connected on the other side with a lug 14 by means of bolts or pins 16 and 18. The lug 14 forms an extension of the coupling 10.

With this arrangement the housing 1 can move in relation to the coupling 10 retaining at the same time its coaxial alignment with the coupling. A spring 20 is placed between the housing 1 and coupling 10 being attached with one end to an eye 21 on the housing, and to a bolt 22' passing through a threaded lug on the coupling 10. The upward movement of the housing is limited by the lug 13 striking the body of the coupling 10, and the lower position of the housing 1 is determined by the extension 19 of the link 8 striking the lug 14.

The spring tension is adjusted so that the apparatus hangs in a middle position, so that a comparatively small pressure one way or the other may displace it from this position. This is important in order to facilitate the selfalignment of the couplings as will be explained hereinafter.

Instead of using parallel links 8 and 9, the parallel motion of the housing 1 may be accomplished by means of crossed links 23 and 24 pivotally connected together in the middle on a pin 25, and pivoted on one side to lugs 30 and 32 with pins 26 and 28 respectively, the lug 28 forming a part of the housing 1, and the lug 30 being attached to the coupling 10. On the other side the links 23 and 24 are provided with pins 27 and 29 placed in slots 27' and 29' in lugs 31 and 33 on the coupling 10 and housing 1 respectively.

The housing 1 is provided on all sides with aligning lugs 34, 35 and 36. These lugs extend in front of the housing and curve outwards, forming guiding surfaces for the housings of the cars, when they come together, so as to bring them together in a perfect alignment.

Lugs 37 of comparatively larger size are used to accomplish preliminary horizontal alignment of the respective housings before they come close enough together for the smaller aligning lugs 34, 35 and 36. These lugs 37 are formed with tapering surfaces adapted to meet tapering lugs 38 on the lower sides of the coupling housings 1. These lugs are placed back of the center of gravity of the housing, so that the lug 37 of one coupling housing may lift the other housing to its own height.

The front part of the coupling housing 1 is protected with covers 39 and 40 curved in the form of an arc of a circle and adapted to swing rotatively around the axis passing through the center of the circle. For this purpose the ends of the covers are attached to short shafts 41, 42, 43 and 44 passing through end walls of the housing 1 and provided outside with cams 43' and 44'. Springs 43" and 44" tend to keep the covers closed (the upper shafts with cams are removed in section in Fig. 4). Scrapers 45 and 46 remove dirt accumulations from the outer surfaces of the covers when they are being turned towards inside of the housing 1 so as to expose the ends of cables and pipes inside of the housing 1. The cams are placed so that the ends of guiding lugs 36 strike them when two coupling housings approach each other, so that the covers 39 and 40 swing inside exposing cables and pipes just before the housings become fully connected together.

Once the coupling housings have come together, they are held in this position by means of latches 47 and 48 pivotally mounted on pins 50 passing through bosses 51 on the sides of the housing 1. Free ends of the latches are shaped in the form of hooks adapted to catch lugs or bosses 56 and 57 on the other housing, each housing having two pairs of latches and two pairs of bosses, arranged symmetrically.

The tail end of the latch 47 or 48 has a finger 54 passing through a ring 55 on an arm 55' attached to the box 4. Springs 52 and 53 tend to keep latches 47 and 48 in engagement with bosses 56 and 57, but the ring 54 swings the latches open when the housing 1 is not in engagement with another housing and, consequently, is moved out of the box under action of the spring 3 to the limit of its travel (as determined by the location of the nut 7).

The housing 1 has inspecting apertures or windows 58 and 59 for inspecting the parts inside of the housing in a closed position.

The rear wall of the housing 1 has a number of holes for tubes 65, 66, 67, 68, 69, 70, 71 and 72 for water, gas, steam etc. The tubes are held in place with nuts 70', the outer tube ends being threaded. Elastic bushings (such as rubber, for instance) are placed on the tubes inside (73) or springs 74. The tubes can slide in their respective holes in the wall of the housing 1, so that while they are held in a firm alignment by means of the elastic spacers 73 and 74, they can yield somewhat when pressure is applied to their inner operative ends.

The extension rod 2 has a central aperture 71' for electric cables. All of these tubes are paired together on the outside by means of T's 77 and flexible tubular connectors 78. The T's 77 are adapted to be connected with pipes 75 which form part of regular railway car piping.

The tubular nipples 65 to 72 incl. are provided with coupling terminals 79, 80, 81 and 82 with inserts 83, 84 and 85 of rubber or similar elastic material. These inserts are provided with central apertures 83' forming a continuation of the apertures in the nipples 65 to 72. The inserts 83 and 84 are wedged in corresponding depressions in the terminals 79 and 80, and their face surfaces may be shaped in the form of concentric corrugations (Fig. 7) or may be made convex (Fig. 8), and in the latter case the face surfaces straighten out by mutual compression (Fig. 9), when the couplings are engaged. Asymmetrically arranged lugs 87 serve to guide the terminals together before they are coupled.

The terminals 79 to 81 are screwed on the ends of the nipples 65 to 72 and are further secured with side screws 88.

The electrical conductors 90 in the tube 71 are provided with resilient connectors 86 with curved edges so as to facilitate their mutual engagement.

The operation of the apparatus is as follows.

Figures 3, 3', 4 and 5 illustrate position of the couplings on the cars before they have been coupled.

The coupling housings 1 are moved forward from the boxes 4 under action of the springs 3, being held in that position by the nuts 7 resting against the edges 6 of the boxes 4. The fingers 54, being held by the rings 55, raise latches 47 into an inoperative position (see Fig. 4). The covers 39 and 40 are closed under action of closing springs 44″. All the nipples or tubes 65 to 72 are moved slightly forward under action of resilient bushings 73 or springs 74 (except tubes 71 with electrical connectors).

When the cars to which my couplings are attached are moved together to be coupled, then the large guiding lugs 37 meet cams or lugs 38 of the opposite couplings, so that the coupling housing which happens to be located higher lifts the other coupling to its own height.

With the further movement of the cars together final alignment of the coupling housings is accomplished by means of guiding lugs or fingers 34, 35 and 36. Just before the final contact is made, fingers 36 strike cams or wings 44′ thereby swinging the covers 39 and 40 inwards and exposing the ends of tubes inside. The inserts 84 and 85 meet each other and become compressed thereby forming an air tight joint between the ends of the tubes, the lugs 87 guiding the terminals 80 and 81 together. The contacts 86 form electrical connections, and the housings themselves come together with their front edges.

All this happens before the cars have been coupled together mechanically. With their further movement the housings 1 begin to move back towards boxes 4, compressing springs 3. The rings 55 will then release their tension on the fingers 54 of the latches 47, which will then turn under action of springs 52 and catch with their hooked ends the bosses 56 and 57, thereby locking the housings together.

The cars will continue to move together, the springs 3 being further compressed, and finally the mechanical coupling of the cars takes place.

This arrangement with springs 3 permits the coupling to remain tightly connected regardless of ordinary working variations and play in mechanical couplings.

The uncoupling of this apparatus is also accomplished entirely automatically.

With the mechanical couplings between the cars uncoupled the cars begin to move apart, but the coupling housings 1 remain coupled until they move far enough from the boxes 4 when the rings 55 begin to exert pressure on fingers 54 thereby opening the latches 47. Next the nuts 7 will strike the edges 6 of the boxes 4, and the coupling housings will be pulled apart. The wings 44′ being released, springs 44″ will swing covers 39 and 40 into closed positions.

In this position the coupling housings are ready to be coupled again automatically.

They may be placed, however, in an inoperative position, when any engagement between coupling housings cannot take place.

For this purpose the bolt 15 is removed (after pins 15′ and 15″ have been removed from its end), then the coupling housing is moved on the link 9 until the hole for the bolt 15 in the lug 13 meets a hole 88′ in the lug 14, and the bolt 15 is placed in these holes thereby locking the apparatus in an inoperative position.

My apparatus may be used in conjunction with any existing individual couplings for pipes between the cars, these couplings being used to permanently connect the pipe ends with T's 77 of my apparatus.

The latches 47 may be operated by any suitable mechanical connections with boxes 4 (for instance, by chains), with couplings 10, or even with drawbars 11.

Important advantages of my coupling are that it becomes engaged with corresponding coupling on another car or disengaged entirely automatically, being controlled only by movement of the cars together or apart respectively, also that it can accommodate any practical number of pipes or conductors, can be connected with pipes using their individual couplings, and that it is protected in its inoperative position from dirt and dust.

I claim as my invention:

1. In an automatic gas and electric coupling for railway cars, the combination with a housing, pipe nipples in said housing, means to connect said pipe nipples with pipes of the car, connecting terminals on front ends of said nipples, electrical connectors in said housing, cables extending to said connectors from said car, an extension rod on the rear end of said housing, a box adapted to receive said extension rod, a spring in said box, a shoulder on said extension rod adapted to press on said spring, said rod passing through an aperture in the rear end of said box, a nut on the outer end of said rod adapted to limit the movement of said rod with said housing, a yielding means to align said rod in said box, and means to support said box in a parallel coordination with the drawbar of said car.

2. In an automatic gas and electric coupling for railway cars, the combination with a housing, pipe nipples in said housing, means to connect said pipe nipples with pipes of the car, connecting terminals on front ends of said nipples, electrical connectors in said housing adapted to be connected with electrical conductors of said car, an extension rod on the rear end of said housing, a box adapted to receive said extension rod, a spring in said box, a shoulder on said extension rod adapted to press on said spring, said rod passing through an aperture in the rear end of said box, a nut on the outer end of said rod adapted to limit the axial movements of said rod, a plurality of springs in said box adapted to keep said rod in a central position, and a yielding means for supporting said box in a parallel coordination with the drawbar of said car.

3. In an automatic gas and electric coupling for railway cars, the combination with a housing, pipe nipples in said housing, means to connect said pipe nipples with pipes of the car, electrical connectors in said housing adapted to be connected with electrical conductors of said car, an extension rod on the rear end of said housing, a box adapted to receive said extension rod, a spring between said box and said rod, means to limit the axial movement of said rod in said box, a plurality of links supporting said box on said car, and a resilient member between said box and said car.

4. In an automatic gas and electric coupling for railway cars, the combination with a housing, pipe nipples in said housing adapted to be connected with pipes of the car, terminals, on front ends of said nipples, elastic inserts in said terminals, electrical connectors in said housing adapted to be connected with electric conductors of said car, an extension rod on the rear end of said housing, a box supporting said extension rod with said housing, said rod being adapted to slide in said box, a spring between said box and said rod, means to limit said sliding movement of the rod, resilient members adapted to keep said rod in a coaxial alignment with said box, a plurality of links of equal length pivotally connected with said box and said car and adapted to keep said box with said housing in a parallel alignment with the axis of said car, a spring between said box and said car, and means to limit the movement of said box in relation to said car.

5. In an automatic gas and electric coupling for railway cars, the combination with a housing, pipe nipples in said housing, means to connect said pipe nipples with pipes of the car, elastic terminals on front ends of said nipples, electrical connectors in said housing connected with electrical conductors of said car, an extension rod on the rear end of said housing, a box supporting said extension rod with said housing, said rod being adapted to slide in said box, a spring between said box and said rod, means to limit the sliding movement of said rod in said box, a resilient means to support said box with said housing on said car, a plurality of covers for said terminals and said electrical connectors, and means to move said covers away from said terminals and said connectors, said means being controlled by a corresponding coupling housing of another car, when said cars are being coupled together.

6. In an automatic gas and electric railway car coupling, the combination with a housing, pipe nipples in said housing connected with pipes of the car, terminals on front ends of said nipples, guiding lugs in front of said housing, an extension rod on the rear end of said housing, a box supporting said extension rod with said housing, said rod being adapted to slide in said box along its axis, a spring between said box and said rod, means to limit said sliding movement, a latch on said housing adapted to engage a corresponding coupling housing of another car when said cars are brought together, a spring adapted to keep said latch in an operative position, and means to release said latch, said releasing means being controlled by the relative movement between said housing and said box.

7. In an automatic gas and electric coupling for railway cars, the combination with a housing, pipe nipples in said housing adapted to be connected with pipes of the car, terminals on front ends of said nipples, a supporting member for said housing, a spring connection between said housing and said supporting member, a flexible connection between said supporting member and said car, a plurality of latches pivotally mounted on said housing and adapted to engage corresponding housing of another car when said cars are being coupled together, springs adapted to keep said latches in a closed position, and means to release said latches, said means being controlled by the relative movement between said housing and said car.

Signed at New York in the county of New York and State of New York this 21st day of February A. D. 1923

THEODORE P. GARANKIN.